Dec. 16, 1924.
H. GROTHE ET AL
AUGER FOR POSTHOLES AND WELLS
Filed Dec. 4, 1923
1,519,132
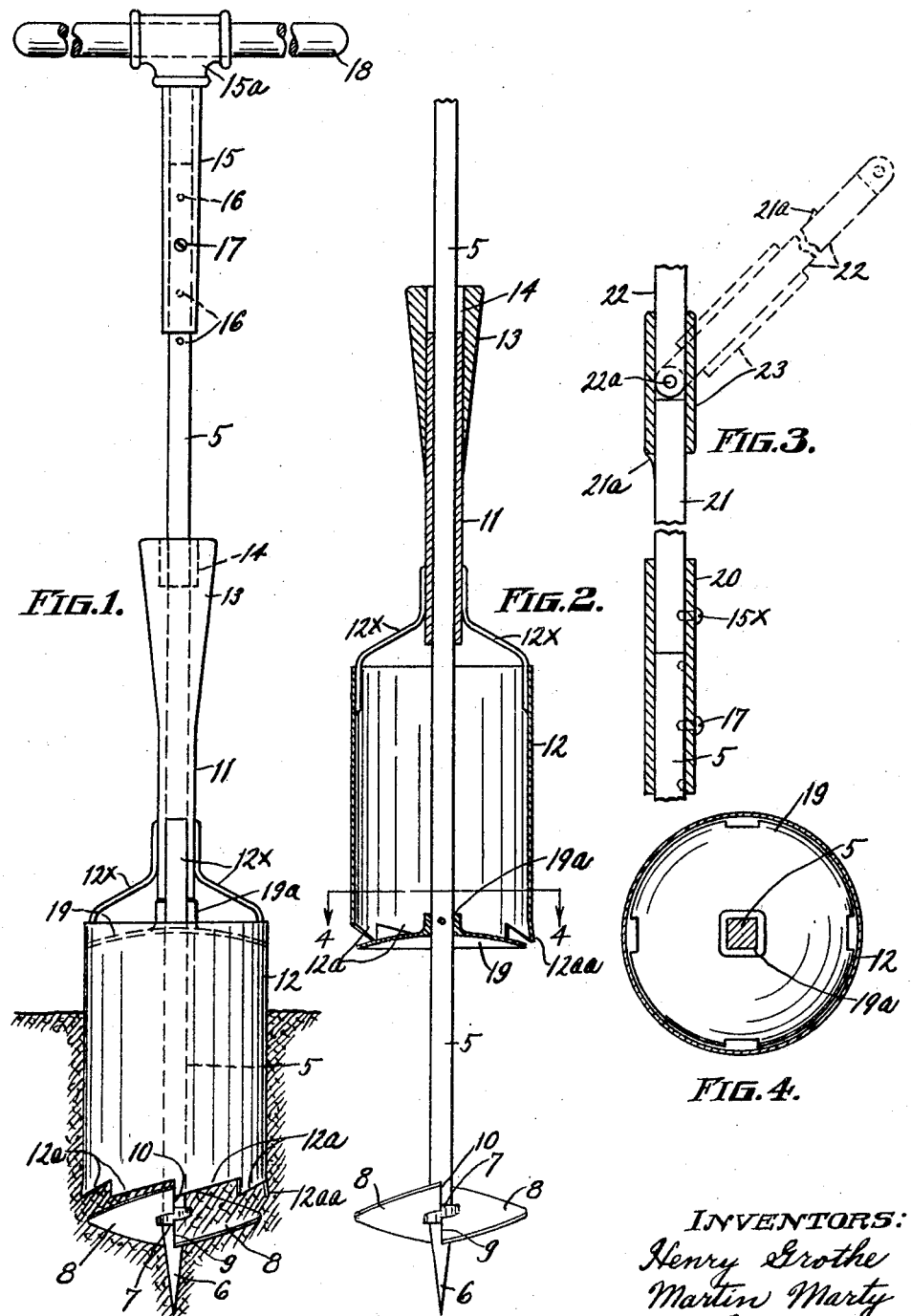
INVENTORS:
Henry Grothe
Martin Marty
BY A. M. Carlsen
ATTORNEY.

Patented Dec. 16, 1924.

1,519,132

UNITED STATES PATENT OFFICE.

HENRY GROTHE, OF LE SUEUR CENTER, AND MARTIN MARTY, OF ST. PAUL, MINNESOTA.

AUGER FOR POSTHOLES AND WELLS.

Application filed December 4, 1923. Serial No. 678,396.

*To all whom it may concern:*

Be it known that we, HENRY GROTHE and MARTIN MARTY, citizens of the United States, residing, respectively, at Le Sueur Center, in the county of Le Sueur and State of Minnesota, and St. Paul, in the county of Ramsey and State of Minnesota, have invented certain new and useful Improvements in Augers for Postholes and Wells, of which the following is a specification.

Our invention relates to devices for digging postholes, wells and the like, and the object is to provide a simple, inexpensive and efficient device particularly adaptable for digging postholes but also adaptable for making deep holes for wells or prospecting purposes such as determining the character of the soil at different depths.

In the accompanying drawing:

Fig. 1 is a side elevation of our device used as a posthole digger.

Fig. 2 is an approximately central, vertical section of the main part of Fig. 1 with the slidable digging means in changed position.

Fig. 3 is a partly sectional elevation of an extensible shank construction adapted to be applied to shank 5 in Fig. 1 for digging deep holes.

Fig. 4 is an enlarged sectional view on line 4—4 in Fig. 2.

Referring to the drawing by reference numerals, 5 is an elongated shank, preferably a steel bar square in cross section and normally in vertical position for hole digging purposes.

The lower end of the shank is pointed as at 6 and just above said point we secure as at 7 two oppositely disposed semi-circular, spiral wings or blades 8 somewhat resembling propeller blades each with a downwardly and radially inclined cutting edge 9 from which it slants upwardly and terminates in an upwardly and radially extending edge 10 preferably arranged above the cutting edge of the adjacent blade.

11 is a sleeve slidable on shank 5 and 12 is a metallic cylinder connected to the lower end of the sleeve by arms 12$^x$ suitably secured to said part of the sleeve and to the upper end of the cylinder (see Figs. 1 and 2). The upper end of the sleeve is provided with an enlargement 13 which may be integral with or secured to the sleeve and preferably projecting above the upper end thereof forming a pocket 14 about the shank.

The lower edge of the cylinder comprises a circular row of teeth 12$^a$ and resembles a band saw, and the teeth may even be bent outwardly or staggered as in a saw (see teeth 12$^{aa}$ in Figs. 1 and 2).

19 is a circular disc secured as at 19$^a$ on shank 5, at a distance from blades 8 approximately the same as the length of cylinder 12. In starting digging operations with the device the cylinder is brought to position with relation to the digger blades about as shown in Fig. 1, that is, the lower cutting edge of the cylinder is just above the blades 8, at which time the hub of disc 19 is in contact with the lower end of sleeve 11 and the disc itself is adjacent the upper end of the cylinder.

For ordinary posthole digging we provide a T-shaped device detachably secured on the upper part of the shank 5. Said device comprises a square pipe 15 adapted to slidably engage the shank, the latter having a number of small indentures 16 to be engaged by a small set screw 17 or similar means in the pipe. The upper end of the pipe carries a pipe T 15$^a$ through the straight run of which a handle-bar 18 may be inserted.

The point 6 is first stuck into the ground where it is desired to dig a posthole. Using the bar 18 as a lever the operator pushes downwardly until the blades 8 contact with the ground at which time he begins revolving the device, causing the blades to cut into the ground spirally. As the blades 8 work down into the soil, the revolving cylinder 12 follows and its teeth make a circular cut which deepens as the blades work downwardly. As the blades work downwardly their propeller-like shape will cause the dirt to be forced upwardly into the cylinder until the latter is filled with it up to disc 19. When the cylinder has thus been filled the operator simply withdraws the device upwardly, grasps the enlarged part 13 of the sleeve 11 and slides the cylinder upwardly toward the T-handle, or accomplishes the same result by holding the cylinder rigid and pushing the shank 5 down. In either case the disc 19 is brought out of the cylinder to position shown in Fig. 2 forcing the soil out of the cylinder to be dumped wherever desired. The operator then repeats the operation, each time of course getting deeper in the ground, the cylinder being guided downwardly in a straight line in the previously formed round bore in the ground.

For digging holes deeper than ordinary postholes we provide an extensible shank illustrated in Fig. 3, in which 20 is a sleeve replacing sleeve 15 and secured on shank 5 by screw 17. 21 is an extension bar the lower end of which is secured in the upper part of sleeve 20 by a screw 15ˣ but its upper end is pivotally connected at 22ᵃ to another extension bar 22 carrying a slidable collar 23 which may be slipped down over the joint when the bars 21—22 are in alignment. 21ᵃ is a lug on bars 21—22 limiting the downward movement of the collar. Any number of bar sections 22 may be used forming joints like 22ᵃ each with a slidable collar, as described. It will of course be understood that the bars 22 are all connected to each other as at 22ᵃ. In this manner successive rigid extensions may be added to bar 21 and when such sectional bar is drawn out of the ground, after finishing a digging job, the collars 23 are slipped upward off the joints permitting the sections to be folded up in a small space, and during the digging to rest on the ground each time the cylinder is pulled up and emptied. If the device is merely to be adjusted for extra deep postholes the screw 17 and dents 16 in Fig. 1 will answer the purpose.

It will be readily understood that the enlargement 13 of sleeve 11 provides a convenient handle for the operator, the enlarged end preventing any part of the operator's hand from getting mutilated between it and the member 15, the latter coming down into the recess 14 when the soil is expelled from the cylinder.

We claim:

1. An auger of the class described comprising an operating rod with means at its upper end for rotating it, the lower end forming a sharp point and near above said point spiral shaped digger blades, a disc fixed on the rod some distance above the digger blades and of about the same radius as the blades, a hollow cylinder arranged to receive the disc and pass downward almost to the digger blades, said cylinder having secured to its upper end a sleeve slidable but not rotatable on the rod and the lower end of the cylinder having teeth adapted to cut the way for the cylinder as the device works downward in the ground, said operating rod being formed of several sections pivoted together and having a slidable sleeve adapted to cover each joint to hold it stiff when so desired, and means for holding said sleeve in position about the joint.

2. The structure specified in claim 1, in which said non rotatable sleeve has its upper end enlarged in diameter to form a handhold, and said handle having in its upper end a recess making it a guard about the rod for the purposes set forth.

In testimony whereof we affix our signatures.

HENRY GROTHE.
MARTIN MARTY.